United States Patent [19]

Sekella et al.

[11] Patent Number: 4,744,449
[45] Date of Patent: May 17, 1988

[54] COMPACT ELECTROMAGNETIC TOOTH CLUTCH

[75] Inventors: Thomas C. Sekella, Elmira; Kenneth F. Seager, Sr., Horseheads, both of N.Y.

[73] Assignee: Facet Enterprises, Inc., Tulsa, Okla.

[21] Appl. No.: 901,811

[22] Filed: Aug. 29, 1986

[51] Int. Cl.⁴ .................................................. F16D 27/10
[52] U.S. Cl. ................................. 192/84 C; 192/70.28
[58] Field of Search .............. 192/84 C, 84 A, 48.2, 192/110 R, 111 B, 70.25, 70.26, 84 AB, 56 R, 70.28, 90; 188/161, 71.7

[56] References Cited

U.S. PATENT DOCUMENTS

| | | | |
|---|---|---|---|
| 2,102,318 | 12/1937 | Hodgson | 192/111 B X |
| 3,181,670 | 5/1965 | Leive | 192/84 C |
| 3,507,374 | 4/1970 | Allaben | 192/94 X |
| 3,559,782 | 2/1971 | Miller | 192/56 R |
| 3,669,231 | 6/1972 | Schindel et al. | 192/84 C X |
| 3,727,736 | 4/1973 | Miller et al. | 192/84 C |
| 3,854,562 | 12/1974 | Wilczewski | 192/84 C |
| 3,857,468 | 12/1974 | Iritono et al. | 192/84 C |
| 4,175,650 | 11/1979 | Miller | 192/84 C |
| 4,353,450 | 10/1982 | Wakefield | 192/84 C |

FOREIGN PATENT DOCUMENTS 45444 4/1979 Japan ........................... 192/84 C

*Primary Examiner*—Rodney H. Bonck
*Assistant Examiner*—Richard M. Lorence
*Attorney, Agent, or Firm*—James R. Ignatowski; Remy J. VanOphem

[57] ABSTRACT

A compact electromagnetic clutch has a toothed armature connected to a driven hub and a toothed driving hub which are moved into engagement with each other upon energization of an electromagnet. A precompressed spring disposed between the bottom of a cylindrical cup attached to the armature and the head of a pin attached to the driven hub biases the armature away from the driving hub. The precompressed spring provides a force strong enough to overcome residual magnetism. The spring is further compressed when the armature moves into engagement with the driving hub upon energization of the electromagnet. After de-energization of the electromagnet, the precompressed spring biases the armature away from the driving hub disengaging the armature teeth from the teeth of the driving hub. The electromagnet is provided with a shaped coil and a conventional ball bearing rotatably supports the driving hub to form an economical compact clutch.

16 Claims, 1 Drawing Sheet

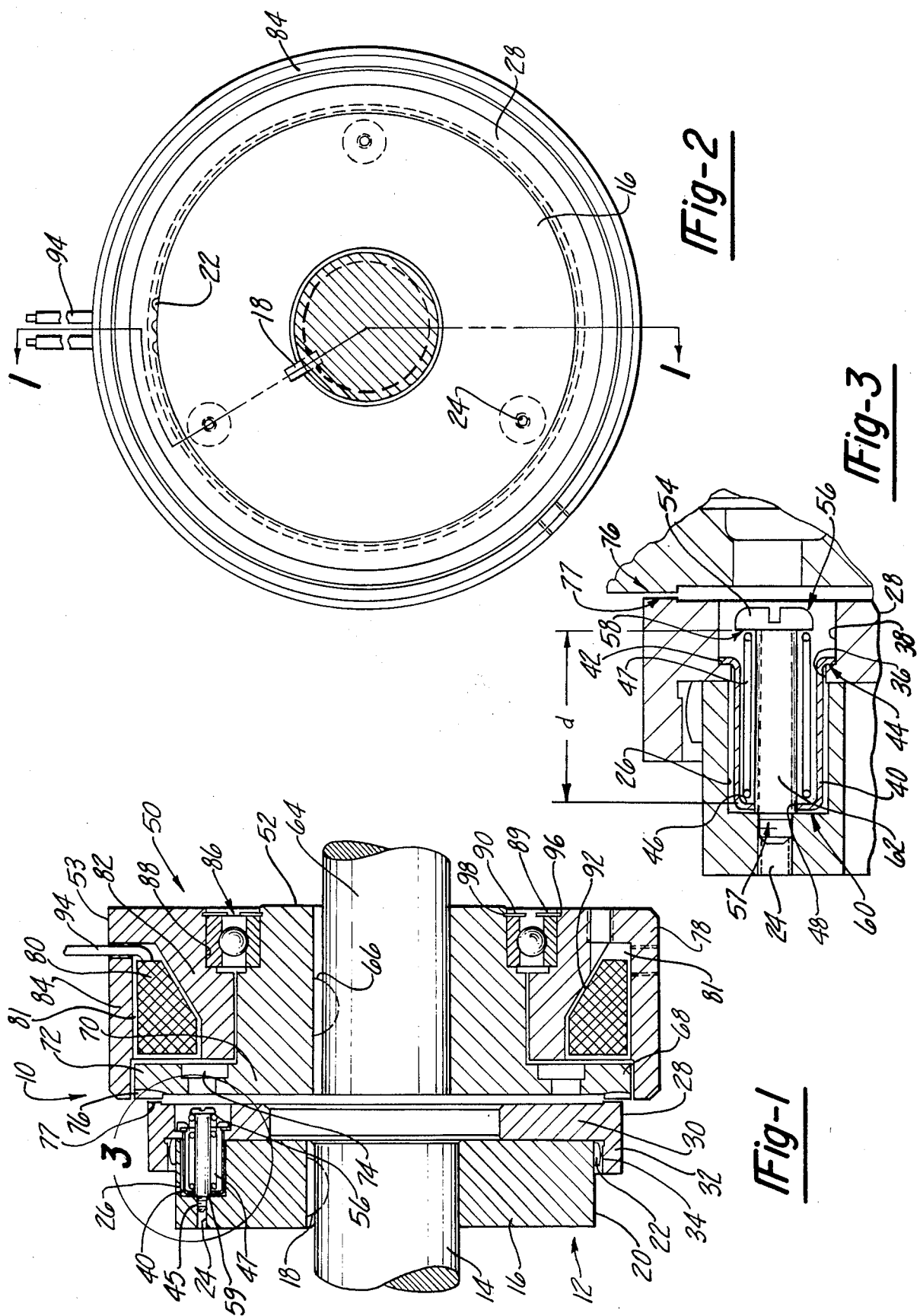

COMPACT ELECTROMAGNETIC TOOTH CLUTCH

BACKGROUND OF THE INVENTION

1. Field of the Invention

The invention relates to electromagnetically operated clutches and, more particularly, to electromagnetic tooth clutches.

2. Description of the Prior Art

Electromagnetic clutches are generally expensive and bulky because of the number of parts employed and the cost of assembly. As an example, U.S. Pat. No. 3,727,736, owned by the assignee of the present application, discloses an electromagnetic clutch having input and output torque transmitting members. The input torque transmitting member, consisting of three integral subparts, is supported for rotation on the outer race of a ball bearing which, in turn, is supported at its inner race by a sleeve which is brazed to a nonrotating magnet body. U.S. Pat. No. 3,857,468, to Iritono, et al, discloses an electromagnetic clutch having a drive shaft and a driven shaft. On the inner end of the drive shaft is a formed rotary disk. An electromagnet including an energizing coil is mounted to the drive shaft through a bearing. The bearing is secured to the drive shaft against axial movement by a snap ring. These devices have been found to be large and bulky because of the number of parts and placement of the bearing. U.S. Pat. No. 3,559,784, owned by the assignee of the present application, discloses an electromagnetic clutch having a double-row, split-race, thin-section aircraft bearing interconnecting a rotary member with a stationary magnet body. The bearing is held in place by a locking compound. This device has been found to have significant drawbacks because of the large expense of the single source aircraft bearings and the expense of the complex assembly technique.

Electromagnetic tooth clutches as used heretofore have a toothed driving clutch member and a toothed driven clutch member which are moved towards each other upon energization of an electromagnet for engagement of their mutually opposing teeth. A spring disengages the teeth when the electromagnet is de-energized. U.S. Pat. No. 3,669,231, to Schindel, et al., discloses the use of a plurality of springs which extend between an inner flange formed on a jaw member and the heads of a plurality of stop pins which threadably engage corresponding tapped holes symmetrically formed around the axis of a core member. The springs urge the jaw member into an abutting relationship with the core member and disengage the teeth when no electromagnetic force is applied.

U.S. Pat. No. 3,507,374, to Allaben, discloses the use of a compression spring extending between a cup and the head of an elongated stud or guide rod to bias a plunger away from an electromagnetic coil when the electromagnetic coil is de-energized. However, these devices have significant drawbacks when applied to electromagnetic tooth clutches because residual magnetism in the driving and driven clutch members tends to impede the separation of the clutch members, thus, requiring additional biasing force to overcome the metal-to-metal contact of the teeth. When the electromagnet is energized, the electromagnetic force, thus, produced must not only overcome the loss as associated with maintaining a field across an air gap, but also the greater biasing force applied for initial breakaway of the metal-to-metal contact of the teeth.

In U.S. Pat. No. 4,353,450, owned by the assignee of the present application, an electromagnetic clutch is provided with a two-stage disengagement spring for separating the clutch members from one another. In this device, the spring is centrally fastened to one clutch member such that one spring length operates against one radial offset on the armature face while another spring length operates against another radial offset on the armature face. The disengaging springs exert a greater spring force for initial breakaway in order to overcome residual magnetism in the metal-to-metal contact of the mutually opposing teeth and a smaller spring force to further separate the clutch members after initial breakaway. This device has been found to have significant disadvantages. The cost to produce an armature with a pair of radial offsets has been found to be very expensive. In addition, springs have a tendency to move out of position from the radial offsets so that the springs do not exert the proper force upon the armature.

Simplified electromagnetic clutches are also known. As an example, U.S. Pat. No. 3,854,562, to Wilczewski, discloses a compact electromagnetic clutch having a stationary field, a rotor, and an armature. The field is a hollow cylindrical housing made of magnetic material with inner and outer peripheral walls defining an annular recess to receive a plastic bobbin having a toroidal coil and a tubular offset extension through which the coil leads extend and which cooperates with a receiving aperture in the housing to extend therethrough as a lead wire strain relief and an anchor to prevent rotation of the field.

However, none of the above devices provide an inexpensive, compact electromagnetic tooth clutch which is simple to install and has the required operating characteristics.

SUMMARY OF THE INVENTION

The present invention is a compact electromagnetic tooth clutch having a driving assembly and a driven assembly. The driving assembly includes an inexpensive ball bearing disposed between a stationary electromagnet 25 and a driving hub. The driven assembly includes a toothed armature, a driven hub and a precompressed disengaging spring for separating the toothed armature from the driving assembly. The precompressed disengaging spring exert sufficient force to separate the toothed armature from the driving assembly a distance sufficient to permit independent rotation of the clutch members. The spring is precompressed between the bottom of an elongated cylindrical cup affixed to the armature and the head portion of a pin affixed to the driven hub. When the armature is moved into engagement, the disengagement spring is further compressed such that sufficient force is developed for initial breakaway to overcome the residual magnetism in metal-to-metal contact of the engaged clutch members when the electromagnet is deenergized. With this arrangement, a compact electromagnetic tooth clutch which is easy to assemble, and which utilizes simple, inexpensive components, is presented which has the required operating characteristics.

It is, therefore, an object of the present invention to provide a compact electromagnetic tooth clutch which is simple and easily assembled.

It is a further object of the present invention to provide a compact electromagnetic tooth clutch which is of more economical construction than similar prior art designs which utilize expensive aircraft bearings.

It is a further object of the present invention to provide a compact electromagnetic tooth clutch which is assembled and provides a biasing force sufficient to overcome residual magnetism to separate the clutch members when the electromagnet is de-energized. In accordance with this object, a precompressed disengagement spring is provided.

BRIEF DESCRIPTION OF THE DRAWINGS

FIG. 1 is a partial cross-sectional side view, of the electromagnetic tooth clutch shown in FIG. 2, taken along the section line 1—1;

FIG. 2 is an end view of the electromagnetic tooth clutch; and

FIG. 3 is an enlarged sectional view of the cylindrical cup and spring assembly shown within the circle 3 of FIG. 1.

DETAILED DESCRIPTION OF THE PREFERRED EMBODIMENT

Referring generally to FIGS. 1 and 2, the electromagnetic tooth clutch assembly generally designated by the numeral 10 includes a driven assembly 12 keyed to a driven shaft 14 and a driving assembly 50 keyed to a driving shaft 64. The driven assembly 12 includes a hub 16 secured to the driven shaft 14 by a key 18 and an armature 28 rotatably connected to the hub 16. An external spline 22 is provided about a rim 20 of the hub 16. Threaded bores 24 for attaching the armature 28 to the hub 16 are symmetrically formed around the axis of rotation of the hub 16. Counterbores 26 are concentrically formed with the threaded bores 24. The armature 28 has an annular portion 30, the outer periphery of which terminates in a circumferential flange 32. An internal spline 34 provided on the inner surface of the circumferential flange 32 mates with the external spline 22 on the rim 20. The splines 22 and 34 cooperate to rotatably connect the hub 16 to the armature 28 and permit axial movement of the armature 28 relative to the hub 16.

A plurality of bores 36 (shown in FIG. 3) are symmetrically formed around the axis of rotation of the armature 28 and are coaxial with the threaded bores 24 of the hub 16. Counterbores 38 are formed in the armature 28 concentric with the bores 36. Elongated cylindrical cups 40 are assembled into the bores 36 of the armature 28. Each of the cups 40 has a radial flange 42 radially extending about its open end which engages an annular shoulder 44 formed at the junction between the bores 36 and counterbores 38 of the armature. The radial flanges 42 establish the position of the cylindrical cups 40 in the bores 36. Each of the cylindrical cups 40 extends into a respective one of the counterbores 26 of the hub 16. An annular spring seat 46 partially encloses the opposite end of each cylindrical cup 40. A spring member 47 is precompressed during assembly between the spring seat 46 of the cylindrical cup 40 and a head 54 of a stop pin 56. A threaded end 45 of the shaft 57 of the stop pin 56 passes through an opening 48 in the annular spring seat 46 at the bottom of the cylindrical cup 40 and is threadably received in the threaded bores 24 of the hub 16. The amount of precompression of the spring is determined by the distance "d" between the bottom surface 58 of the stop pin's head 54 and the annular spring seat 46. In the preferred embodiment, the distance "d" is established by a spacer sleeve 62, circumscribing the shaft of the stop pin 56, which extends from an annular hub shoulder 60 formed at the junction between the threaded bore 24 and the counterbore 26 of the hub 16 to the bottom surface 58 of the stop pin's head. Alternatively, the stop pin may have a shoulder, the depiction of which can be understood from a shoulder 59, which abuts the annular hub shoulder 60 of the hub to establish the distance "d".

Referring to FIG. 1, the driving assembly 50 has a hub 52 and an electromagnet 53 as shown. The hub 52 is secured to the driving shaft 64 by a key 66. The hub 52 is made from a magnetic material and has a radial flange 68. The central portion of the hub 52 forms an inner pole 70 and the flange 68 forms an outer pole 72 of an electromagnetic circuit formed in conjunction with the electromagnet 53. The inner pole 70 is separated from the outer pole 72 by kidney shaped slots 74 symmetrically spaced around the radial flange 68. A set of radial teeth 76 provided on the face of the radial flange 68 engage a mating set of radial teeth 77 provided on the armature 28 when the armature 28 is axially displaced towards the hub 52.

The electromagnet 53 has an annular core 78 of magnetic material having a substantially U-shaped cross-section which forms an annular coil cavity 81. A field coil 80 is positioned in the coil cavity 81 between an inner leg 82 and an outer leg 84 of the U-shaped annular core 78. The open end of the coil cavity is adjacent to the radial flange 68 of the hub 52. The electromagnet 53 is rotatably mounted to the hub 52 by a ball bearing 86 of a conventional type. The ball bearing 86 is positioned in a recess 88 formed between the hub 52 and the annular core 78. The ball bearing 86 is held in position by a pair of retaining rings 89 and 90 positioned in retainer grooves 96 and 98. The field coil 80 is formed with a bevelled face 92 to allow the ball bearing to be positioned as close as possible to the radial flange 68 while maintaining a sufficient cross-sectional area of the annular core 78 in the region between the field coil and the ball bearing for developing sufficient magnetic flux. The field coil 80 is connected to an electrical lead 94 for energization from a source of electrical power (not shown).

OPERATION

To engage the electromagnetic tooth clutch, the electromagnet 53 is energized.

When the electromagnet 53 is energized, flux passes from the outer leg 84 of the annular core 78 to the outer pole 72 of the hub 52, through the armature 28 to the inner pole 70, and then to the inner leg 82 of the annular core. The magnetic forces generated by the electromagnet 53 displace the armature 28 axially toward the radial flange 68 causing the set of radial teeth 77 on the face of the armature 28 to engage with the mating set of radial teeth 76 on the face of the radial flange 68. The axial displacement of the armature is guided by the splines 22 and 34 provided on the hub 16 and armature 28, respectively. The engagement of the teeth 76 with the teeth 77 provides a driving connection between the armature 28 and the hub 52. When the armature 28 moves axially on the hub 16 the spring members 47 are further compressed between the annular spring seat 46 provided at the bottom of the cylindrical cups 40 and the bottom surfaces 58 of the heads 54 of the stop pins 56.

To disengage the electromagnetic tooth clutch, the electromagnet is de-energized and the spring members 47 move the armature 28 axially along the hub 16 to disengage the teeth 76 from the teeth 77. Disengagement of the teeth 76 and 77 permits independent rotation of the driven assembly 12 and the hub 52.

With this arrangement, the magnetic force required for engaging the radial teeth 76 and 77 need only overcome the force of the precompressed spring members 47 to begin movement of the armature 28 towards the hub 52. As the armature 28 moves towards the hub 52 the spring members 47 are further compressed to develop a spring force sufficient to disengage the metal-to-metal contact of the radial teeth and separate the armature 28 from the hub 52 when the electromagnet is de-energized.

Having, thus, described the present invention by way of an exemplary embodiment, it will be apparent to those skilled in the art that many modifications may be made from the exemplary embodiment without departing from the spirit of the present invention or the scope of the claims appended hereto.

What is claimed is:

1. A compact electromagnetic clutch comprising:
   a driven clutch member having an axis of rotation, said driven clutch member having a driven hub, an annular armature disposed coaxial with said driven hub and adjacent thereto, said annular armature having a first set of radial teeth disposed on the face opposite said driven hub, means for connecting said annular armature to said driven hub for rotation therewith, said means for connecting enabling axial translation of said annular armature relative to said driven hub, and means for biasing said annular armature towards said driven hub, said means for biasing comprising a plurality of cylindrical cup members symmetrically disposed about said axis of rotation, each of said cylindrical cup members having an open end supported from said annular armature and a bottom end received in a counterbore provided in said driven hub, said bottom end of each said cylindrical cup member being partially closed by an annular spring seat which circumscribes a central stop pin aperture, a stop pin member disposed in each of said cylindrical cup members, each of said stop pin members having a head provided at one end thereof and an opposite end which passes through said stop pin aperture and is fixedly attached to said driven hub, and a precompressed disengagement spring disposed in each of said cylindrical cup members between said annular spring seat and said head of said stop pin member;
   a magnetically susceptible driving hub disposed coaxial with said driven clutch member, said driving hub having a radial flange displaced a predetermined distance from said annular armature, said radial flange having a plurality of kidney shaped apertures defining inner and outer magnetic pole regions thereof, and having a second set of radial teeth operative to engage said first set of radial teeth;
   an electromagnet having an annular core member circumscribing said driving hub, said annular core member having a U-shaped cross-section defining an annular coil cavity, the open end of which is disposed adjacent to said radial flange, a field coil disposed in said annular coil cavity for generating a magnetic field having a field strength sufficient to displace said annular armature towards said radial flange of said driving hub and engage said first set of radial teeth with said second set of radial teeth; and
   a ball bearing disposed between said annular core member and said driving hub for rotatably supporting said electromagnet adjacent to said radial flange.

2. The electromagnetic clutch as claimed in claim 1 wherein said annular armature has a plurality of cup bores symmetrically disposed about said axis of rotation for receiving said cylindrical cup members therethrough, each of said plurality of cup bores having a counterbore forming an annular shoulder, and wherein each of said cylindrical cup members has a radial flange provided about its open rim end which abuts said annular shoulder when said cylindrical cup member is received in said cup bore.

3. The electromagnetic clutch as claimed in claim 1 wherein said opposite end of said stop pin member is threaded and said driven hub has a threaded bore for threadably receiving said stop pin member.

4. The electromagnetic clutch as claimed in claim 1 having means for spacing the bottom surface of said head of said stop pin member a predetermined distance from the bottom of said counterbore of said driven hub to provide a desired disengagement force.

5. The electromagnetic clutch as claimed in claim 4 wherein said means for spacing is a cylindrical sleeve disposed around said stop pin member between the bottom surface of said head of said stop pin member and the bottom of said counterbore of said driven hub.

6. The electromagnetic clutch as claimed in claim 4 wherein said stop pin member has a shoulder provided adjacent to its opposite end which engages the bottom of said counterbore of said driven hub to establish said predetermined distance between the bottom surface of said head of said stop pin member and the bottom of said counterbore of said driven hub.

7. The electromagnetic clutch as claimed in claim 1 wherein said annular armature has a circumferential flange overlapping a portion of said driven hub, said means for connecting said annular armature to said driven hub is an external spline provided about the rim portion of said driven hub and a mating internal spline provided about the inner diameter of said circumferential flange.

8. The electromagnetic clutch as claimed in claim 1 wherein a portion of the internal surface of said coil cavity adjacent to said driving hub is tapered away from said driving hub to provide clearance for said ball bearing and wherein said field coil is contoured to fill said coil cavity.

9. A compact electromagnetic clutch comprising:
   a first hub for attachment to a driven member, said first hub having an axis of rotation and an external spline provided about its rim;
   an annular armature disposed adjacent to and coaxial with said first hub, said annular armature having a circumferential flange extending over at least a portion of said rim of said first hub, said circumferential flange having an internal spline provided in its internal surface, said internal spline engaging said external spline of said first hub;
   a plurality of cylindrical cup members disposed symmetrically about said axis of rotation, said plurality of cylindrical cup members having an open end supported from said annular armature and a bottom end received in concentric bores provided in said first hub, said bottom end being partially enclosed by an annular spring seat which defines a stop pin aperture;

a stop pin disposed in said each of said plurality of cylindrical cup members, said stop pin having a head provided at one end and an opposite end which passes through said stop pin aperture and is fixedly attached to said first hub;

a precompressed coil spring circumscribing said stop pin between said annular spring seat and said head of said stop pin for producing a force biasing said annular armature towards said first hub;

a second hub for attachment to a driving member, said second hub having a body portion and a radial flange, one face of said radial flange being axially displaced a predetermined distance from said annular armature;

a stationary magnetic core member circumscribing said body portion of said second hub, said stationary magnetic core member having a U-shaped cross-section defining an annular coil cavity, the open end of which faces said radial flange of said second hub;

a field coil disposed in said coil cavity for generating a magnetic field having a field strength sufficient to axially displace said annular armature to engage said radial flange of said second hub, the flux path of said magnetic field being defined by said stationary magnetic core member, said radial flange and said annular armature;

a ball bearing disposed between said stationary magnetic core member and said second hub for supporting said second hub for rotation relative to said stationary magnetic core member; and means adjacent said first and second hubs for clutchingly engaging said first hub with said second hub when said field coil generates said magnetic field.

10. The electromagnetic clutch as claimed in claim 9 wherein said annular armature has a first set of radial teeth provided on the face thereof adjacent to said radial flange of said second hub and said radial flange of said second hub has a second set of radial teeth provided on the face thereof adjacent to said annular armature, said first and second set of radial teeth operative to engage each other when said annular armature is displaced to engage said radial flange by said field coil generating a magnetic field.

11. The electromagnetic clutch as claimed in claim 9 wherein said annular armature has a plurality of cup bores symmetrically disposed about said axis of rotation for receiving said plurality of cylindrical cup members therein, each of said plurality of cup bores having a counterbore forming an annular flange seat about each cup bore and wherein said open end of each of said plurality of cylindrical cup members has a radial flange which abuts said annular flange seat when said cup member is received in said cup bore.

12. The electromagnetic clutch as claimed in claim 9 wherein said opposite end of said stop pin is threaded and said first hub has a threaded bore for threadably receiving said stop pin to fixedly attach said stop pin to said first hub.

13. The electromagnetic clutch as claimed in claim 9 having means for adjusting the precompression of said coil spring to exert a predetermined force biasing said annular armature away from said second hub.

14. The electromagnetic clutch as claimed in claim 13 wherein said means for adjusting is a cylindrical sleeve having a predetermined length, said cylindrical sleeve circumscribing said stop pin between said head and the bottom of said concentric bore of said first hub.

15. The electromagnetic clutch as claimed in claim 13 wherein said means for adjusting is a shoulder provided adjacent to said opposite end of said stop pin which abuts the bottom of said concentric bore of said first hub, said shoulder being located a predetermined distance from said head of said stop pin.

16. The electromagnetic clutch as claimed in claim 9 wherein a portion of the internal surface of said coil cavity adjacent to said second hub is tapered away from said ball bearing and wherein said field coil is contoured to accommodate said tapered surface.

* * * * *

UNITED STATES PATENT AND TRADEMARK OFFICE
CERTIFICATE OF CORRECTION

PATENT NO. : 4,744,449

DATED : May 17, 1988

INVENTOR(S) : Sekella, et al

It is certified that error appears in the above-identified patent and that said Letters Patent is hereby corrected as shown below:

Column 2, line 46, delete "25".

Column 4, line 65, after "16" insert a comma ---- , ----.

Column 6, line 25, delete "P1n" and insert ---- pin ----.

Signed and Sealed this

Twenty-eighth Day of March, 1989

Attest:

DONALD J. QUIGG

*Attesting Officer*  *Commissioner of Patents and Trademarks*